US011256539B2

(12) United States Patent
Fang et al.

(10) Patent No.: US 11,256,539 B2
(45) Date of Patent: Feb. 22, 2022

(54) TASK PROCESSING METHOD, APPARATUS, AND SYSTEM BASED ON DISTRIBUTED SYSTEM

(71) Applicant: Alibaba Group Holding Limited, Grand Cayman (KY)

(72) Inventors: Zheng Fang, Hangzhou (CN); Shaowei Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 146 days.

(21) Appl. No.: 16/080,854

(22) PCT Filed: Feb. 16, 2017

(86) PCT No.: PCT/CN2017/073721
§ 371 (c)(1),
(2) Date: Aug. 29, 2018

(87) PCT Pub. No.: WO2017/148268
PCT Pub. Date: Sep. 8, 2017

(65) Prior Publication Data
US 2019/0266011 A1    Aug. 29, 2019

(30) Foreign Application Priority Data
Feb. 29, 2016   (CN) .......................... 201610112497.5

(51) Int. Cl.
*G06F 9/46*    (2006.01)
*G06F 9/48*    (2006.01)
*G06F 9/50*    (2006.01)

(52) U.S. Cl.
CPC ................ *G06F 9/485* (2013.01); *G06F 9/48* (2013.01); *G06F 9/4881* (2013.01); *G06F 9/505* (2013.01)

(58) Field of Classification Search
CPC .......... G06F 9/485; G06F 9/48; G06F 9/4884; G06F 9/505
See application file for complete search history.

(56) References Cited

U.S. PATENT DOCUMENTS 4,633,387 A * 12/1986 Hartung .............. G06F 12/0866
711/E12.019
5,606,493 A    2/1997 Duscher et al.
(Continued)

FOREIGN PATENT DOCUMENTS

CN    102929707 A    2/2013
CN    103677973 A    3/2014
(Continued)

*Primary Examiner* — Camquy Truong

(57) ABSTRACT

A task processing method, apparatus, and system based on a distributed system. The method comprises: obtaining, by a task processing device, task information from a master control device by initiating a task request, wherein the task information corresponding to the task request is stored in the master control device; starting, by a main process of the task processing device, a corresponding task subprocess by triggering a proxy process for executing the task information after receiving the task information; and storing, by the task processing device, task execution information to a target location through the proxy process, wherein the task execution information comprises one or more of the following pieces of information: a task identifier of the task information, process information of the task subprocess, log information and a return code generated when the task subprocess executes the task information. The present invention solves the main process of the task processing device monitors, according to the task identifier, whether the task information is started and executed, and monitor, according to the return code, whether the task information is fully executed.

20 Claims, 17 Drawing Sheets

(56) References Cited

U.S. PATENT DOCUMENTS

| | | | |
|---|---|---|---|
| 6,032,172 A | | 2/2000 | Kutcher |
| 6,112,225 A | | 8/2000 | Kraft et al. |
| 6,163,792 A | * | 12/2000 | Verheecke ............ G06F 9/4418 |
| | | | 710/15 |
| 6,775,831 B1 | | 8/2004 | Carrasco et al. |
| 6,988,139 B1 | | 1/2006 | Jervis et al. |
| 7,082,604 B2 | | 7/2006 | Schneiderman |
| 7,165,256 B2 | | 1/2007 | Boudnik et al. |
| 7,210,148 B2 | | 4/2007 | Arnold et al. |
| 8,024,395 B1 | | 9/2011 | Odom |
| 9,164,806 B2 | | 10/2015 | Oliver et al. |
| 9,424,096 B2 | | 8/2016 | Barzel et al. |
| 9,582,335 B2 | | 2/2017 | Doukhvalov et al. |
| 9,740,730 B2 | | 8/2017 | Volvovski et al. |
| 2005/0278520 A1 | | 12/2005 | Hirai et al. |
| 2008/0281798 A1 | * | 11/2008 | Chatterjee ............ H04L 67/2847 |
| 2009/0049443 A1 | * | 2/2009 | Powers ................... G06F 9/505 |
| | | | 718/100 |
| 2009/0089794 A1 | * | 4/2009 | Hilton ................... G06F 9/5044 |
| | | | 718/105 |
| 2015/0156155 A1 | * | 6/2015 | Themereau ............. H04L 51/22 |
| | | | 709/206 |
| 2016/0088073 A1 | | 3/2016 | Barzel et al. |

FOREIGN PATENT DOCUMENTS

| | | |
|---|---|---|
| CN | 104106055 A | 10/2014 |
| CN | 104331327 A | 2/2015 |
| CN | 107135268 A | 9/2017 |
| EP | 2960791 A | 12/2015 |
| EP | 3152660 A1 | 4/2017 |

\* cited by examiner

```
                            Client
                              │ ▲
              1. Submit a task│ │9. Perform a callback
                              │ │   of a task status
                              ▼ │
    Driver   2. Distribute the task   Task information processing ──▶ Database
                              │                    ▲
              3. Designate a node                  │8. Perform a callback
                              │                    │   of a task status
                              ▼                    │
    Node         4. Initiate a main process    7. Store a process
                    to execute a process          number of the
    6. Store log locally  5. Start a task process task process
                              │
                              ▼
                      Computing engine
```

```
┌─────────────────────────────────────┐
│ OBTAIN, BY A TASK PROCESSING DEVICE,│── S301
│ TASK INFORMATION FROM A MASTER      │
│ CONTROL DEVICE BY INITIATING A      │
│ TASK REQUEST                        │
└─────────────────────────────────────┘
                 │
                 ▼
┌─────────────────────────────────────┐
│ START, BY A MAIN PROCESS OF THE TASK│── S303
│ PROCESSING DEVICE, A CORRESPONDING  │
│ TASK SUBPROCESS BY TRIGGERING A     │
│ PROXY PROCESS FOR EXECUTING THE TASK│
│ INFORMATION AFTER THE TASK          │
│ INFORMATION IS RECEIVED             │
└─────────────────────────────────────┘
                 │
                 ▼
┌─────────────────────────────────────┐
│ THE TASK PROCESSING DEVICE STORES   │── S305
│ TASK EXECUTION INFORMATION IN A     │
│ TARGET LOCATION THROUGH THE PROXY   │
│ PROCESS                             │
└─────────────────────────────────────┘
```

FIG. 3

```
┌─────────────────────────────────────────┐
│  ┌──────────────┐    ┌──────────────┐   │       ┌──────────┐
│  │MASTER CONTROL│    │MASTER CONTROL│   │       │          │
│  │   DEVICE 1   │    │   DEVICE 2   │   │◄──────│ DATABASE │
│  │(A MASTER     │    │(A SLAVE      │   │       │          │
│  │  MACHINE)    │    │  MACHINE)    │   │       └──────────┘
│  └──────────────┘    └──────────────┘   │
└─────────────────────────────────────────┘
              ▲    ▲
              │    │
┌─────────────┼────┼──────────────────────┐
│  ┌──────────┐    ┌──────────┐           │
│  │   TASK   │    │   TASK   │           │
│  │PROCESSING│ ●●●│PROCESSING│           │
│  │  DEVICE  │    │  DEVICE  │           │
│  └──────────┘    └──────────┘           │
└─────────────────────────────────────────┘
```

FIG. 4

MASTER PROCESS
↓
PROXY PROCESS
↓
TASK PROCESS
SUBPROCESS

FIG. 5

```
        MASTER PROCESS
              |
              v
        PROXY PROCESS  --RECORD-->  LOCAL FILE
         /    |    \
        v     v     v
  TASK      TASK      TASK
  PROCESS 1 ... PROCESS i ... PROCESS n
```

FIG. 6

```
                    ┌─────────────────────────┐
                    │ RESTART THE MAIN PROCESS│
                    └───────────┬─────────────┘
                                ▼
                    ┌─────────────────────────┐
                    │  OBTAIN TASK INFORMATION│
                    └───────────┬─────────────┘
                                ▼
                         ╱WHETHER╲         NO      ┌──────────────────┐
                        ╱ PROCESS ╲───────────────▶│ REGISTER THE TASK│
                        ╲INFORMATION╱              │    TO A MEMORY   │
                         ╲ EXISTS?╱                └────────┬─────────┘
                             │                              ▼
                            YES                    ┌──────────────────┐
                             ▼                     │  START A PROXY   │
                    ┌─────────────────┐            │     PROCESS      │
                    │ RECOVER THE TASK│            └────────┬─────────┘
                    │   INFORMATION   │                     ▼
                    └────────┬────────┘            ┌──────────────────┐
                             ▼                     │  START A TASK    │
                    ┌─────────────────┐            │   SUBPROCESS     │
                    │READ THE TASK PROCESS│        └──────────────────┘
                    │   INFORMATION   │
                    └─────────────────┘
```

FIG. 7

```
                                          S803: EXECUTE THE TASK                                          S805: START A TASK
                                          INFORMATION BY STARTING                                         SUBPROCESS OFFLINE
                                          A TASK SUBPROCESS          S804: STORE THE TASK                 THROUGH THE PROXY
                                          THROUGH A PROXY PROCESS    INFORMATION THROUGH                  PROCESS TO EXECUTE THE
                                                                     THE PROXY PROCESS                    TASK INFORMATION AND SAVE
                                                                                                          THE TASK EXECUTION
                                                                                                          INFORMATION OFFLINE
```

TASK
PROCESSING  - - - - - - - - - - - - - - - - - - - - - - - - - - - - - - - - - - - - - - - - - - -
DEVICE 163

S802: A MAIN PROCESS OBTAINS                              S806: RETURN A TASK STATUS
                        TASK INFORMATION

MASTER
CONTROL     - - - - - - - - - - - - - - - - - - - - - - - - - - - - - - - - - - - - - - - - - - -
DEVICE 161

S801: SUBMIT A TASK                                                   S807: FEED BACK THE TASK LOG

CLIENT
TERMINAL 81 - - - - - - - - - - - - - - - - - - - - - - - - - - - - - - - - - - - - - - - - - - -

FIG. 8

```
┌─────────────────────────────┐
│  FIRST OBTAINING MODULE 91  │
└──────────────┬──────────────┘
               │
┌──────────────┴──────────────┐
│  FIRST EXECUTION MODULE 93  │
└──────────────┬──────────────┘
               │
┌──────────────┴──────────────┐
│   FIRST STORAGE MODULE 95   │
└─────────────────────────────┘
```

FIG. 9

```
┌─────────────────────────────┐
│  FIRST OBTAINING MODULE 91  │
└──────────────┬──────────────┘
               │
┌──────────────┴──────────────┐
│  FIRST EXECUTION MODULE 93  │
└──────────────┬──────────────┘
               │
┌──────────────┴──────────────┐
│   FIRST STORAGE MODULE 95   │
└──────────────┬──────────────┘
               │
┌──────────────┴──────────────┐
│ SECOND EXECUTION MODULE 101 │
└─────────────────────────────┘
```

FIG. 10

```
┌─────────────────┐           ┌─────────────────┐
│ FIRST OBTAINING │           │ SECOND OBTAINING│
│   MODULE 91     │           │   MODULE 111    │
└────────┬────────┘           └────────┬────────┘
         │                             │
┌────────┴────────┐           ┌────────┴────────┐
│ FIRST EXECUTION │           │ FIRST DETERMINING│
│   MODULE 93     │           │   MODULE 113    │
└────────┬────────┘           └─────────────────┘
         │
┌────────┴────────┐
│  FIRST STORAGE  │
│   MODULE 95     │
└────────┬────────┘
         │
┌────────┴────────┐
│ SECOND EXECUTION│
│   MODULE 101    │
└─────────────────┘
```

FIG. 11

```
       FIRST OBTAINING              SECOND OBTAINING
         MODULE 91                    MODULE 111

FIRST EXECUTION              FIRST DETERMINING
         MODULE 93                    MODULE 113

SECOND DETERMINING
                                       MODULE 121
        FIRST STORAGE
          MODULE 95                   FIRST REGISTERING
                                         MODULE 123

SECOND REGISTERING
       SECOND EXECUTION                MODULE 125
         MODULE 101
```

| MASTER CONTROL DEVICE 161 | ↔ | TASK PROCESSING DEVICE 163 |

TASK PROCESSING METHOD, APPARATUS, AND SYSTEM BASED ON DISTRIBUTED SYSTEM

The present application claims priority to China Patent Application No. 201610112497.5, entitled "TASK PROCESSING METHOD, APPARATUS, AND SYSTEM BASED ON DISTRIBUTED SYSTEM", filed 29 Feb. 2016 and corresponding to PCT Patent Application No. PCT/CN2017/073721 filed Feb. 16, 2017 and published Sep. 8, 2017 as WIPO Publication No. WO/2017/148268, all of which are herein incorporated by reference in their entirety.

TECHNICAL FIELD

The present invention relates to the field of distributed systems and, specifically, to a task processing method, apparatus, and system based on a distributed system.

BACKGROUND

With the development of microprocessor technology, a distributed system can have a higher price/performance ratio than a single large centralized system by implementing similar functions at a lower cost. Therefore, distributed systems are becoming more and more commonly-used system architectures.

However, a distributed execution system in the prior art is one designed for a specific application environment. The architecture thereof is as shown in FIG. 1. The system architecture is divided into two layers: a resource management layer and a task execution layer. The resource management layer, referred to as driver, is a central control device of the entire system that is responsible for task assignment, resource allocation, and applications program interface (API) of a client. A task processing device of the task execution layer can implement specific task execution logics called nodes. Each node is deployed on a machine (gateway), and nodes can be horizontally expanded. A task execution flowchart is shown in FIG. 1, described as follows:

a client submits a task for execution through an HTTP interface provided by the driver; the driver distributes the task to a specified node based on an internal resource management model; the node reads the task assigned to it; after acquiring the task, the node registers task information in a memory, starts a task execution process and submits it to a calculation engine for execution, and locally saves the task execution log and the process pid; a state of the task execution (in execution or execution completion) and the task information are fed back to the driver; and the driver returns a callback for the task status to the client.

Based on the above process, the current system mentioned above has at least the following three problems:

1. if the driver is not connected to some nodes in the network, the task information initiated by the driver cannot be successfully sent to the node; and the driver does not know which task information has not been sent successfully;

2. if the task processing device is in a special application environment, such as during an upgrade of the node of the task processing device or when the node of the task processing device is in an interrupted state, which requires a restart of the device, the task information cannot be executed during the restart process; and 3. if a driver repeatedly sends multiple tasks to a node, the node may repeatedly execute the same task information, resulting in waste of resources.

No effective solution has been proposed to address the technical problem of task loss caused by the fact that the task processing device cannot successfully execute the task information when the distributed execution system is established in a specific application environment in the prior part.

SUMMARY

To solve the problem of task loss caused by the fact that the task processing device cannot successfully execute the task information when the distributed execution system is established in a specific application environment, embodiments of the present invention provide a task processing method, apparatus, and system based on a distributed system.

Embodiments of the present invention provides a task processing method based on a distributed system, the method comprising: obtaining, by a task processing device, task information from a master control device by initiating a task request, wherein the task information corresponding to the task request is stored in the master control device; starting, by a main process of the task processing device, a corresponding task subprocess by triggering a proxy process for executing the task information after receiving the task information; and storing, by the task processing device, task execution information to a target location through the proxy process, wherein the task execution information comprises one or more of the following pieces of information: a task identifier of the task information, process information of the task subprocess, log information and a return code generated when the task subprocess executes the task information.

Another embodiments of the invention provides a task processing apparatus based on a distributed system, the apparatus comprising: a first obtaining module, configured to be used by a task processing device to obtain task information from a master control device by the task processing device initiating a task request, wherein the task information corresponding to the task request is stored in the master control device; a first execution module, configured to be used by a main process of the task processing device to start a corresponding task subprocess by triggering a proxy process for executing the task information after receiving the task information; and a first storage module, configured to be used by the task processing device to store task execution information to a target location through the proxy process, wherein the task execution information comprises one or more of the following pieces of information: a task identifier of the task information, process information of the task subprocess, log information and a return code generated when the task subprocess executes the task information.

Another embodiment of the present invention provides a task processing system based on a distributed system, the system comprising: a master control device, configured to store task information; and a task processing device, communicating with the master control device and configured to obtain task information from the master control device by initiating a task request, wherein the task information corresponding to the task request is stored in the master control device; the task processing device is further configured to start a corresponding task subprocess by triggering a proxy process for executing the task information after a main process of the task processing device receives the task information; and the task processing device is further configured to store task execution information in a target location through the proxy process, wherein the task execution information comprises one or more of the following pieces of information: a task identifier of the task information, process information of the task subprocess, log information and a return code generated when the task subprocess executes the task information.

In embodiments of the present invention, a task processing device obtains, from the master control device, task information stored in a master control device by initiating a task request; a main process of the task processing device initiates a corresponding task subprocess by triggering a proxy process for executing the task information after receiving the task information; and the task processing device stores task execution information in a target location through the proxy process.

In embodiments, because the main process and the task subprocess in the task processing device are isolated with the proxy process, even if the main process is stopped or restarted, the proxy process and the task subprocess are not affected and the task information can be executed normally, thereby achieving the goal of not affecting the execution process that is being executed during the main process startup. Moreover, the task processing device actively obtains task information from the master control device; that is, the task processing device has one-way access to the master control device. Therefore, by changing the http mode and synchronously storing the data in the database, it is possible to resolve the deployment problem of a distributed system where the task processing device and the master control device are not in the same network segment environment. This can support task execution at millions of levels, and can deploy nodes at any time through HTTP, which greatly improves environmental adaptability and extensibility of a system.

Therefore, embodiments provided in the present invention solve the problem of task loss caused by the fact that the task processing device cannot successfully execute the task information when the distributed execution system is established in a specific application environment.

BRIEF DESCRIPTION OF THE DRAWINGS

The accompanying drawings herein are used to provide further understanding of the present invention and constitute a part of the present application. Exemplary embodiments of the present invention and the description thereof are used for explaining the present invention instead of constituting improper limitations on the present invention. In the drawings:

FIG. 1 is a flowchart of a task processing in a distributed execution system according to the prior art;

FIG. 2 is a block diagram of a hardware structure of a computer terminal for a task processing method based on a distributed system according to an embodiment of the present invention;

FIG. 3 is a flowchart of a task processing method based on a distributed system according to an embodiment of the present invention;

FIG. 4 is a schematic structural diagram of a distributed execution system according to an embodiment of the present invention;

FIG. 5 is a schematic diagram of an alternative task processing device according to an embodiment of the present invention;

FIG. 6 is a flowchart of a task execution of an alternative task processing device according to an embodiment of the present invention;

FIG. 7 is a flowchart of recovering task information after a re-startup of an alternative task processing device according to an embodiment of the present invention;

FIG. 8 is an interaction diagram of a task processing method based on a distributed system according to an embodiment of the present invention;

FIG. 9 is a schematic diagram of a task processing apparatus based on a distributed system according to an embodiment of the present invention;

FIG. 10 is a schematic diagram of an alternative task processing apparatus based on a distributed system according to an embodiment of the present invention;

FIG. 11 is a schematic diagram of an alternative task processing apparatus based on a distributed system according to an embodiment of the present invention;

FIG. 12 is a schematic diagram of an alternative task processing apparatus based on a distributed system according to an embodiment of the present invention;

FIG. 13 is a schematic diagram of an alternative task processing apparatus based on a distributed system according to an embodiment of the present invention;

FIG. 14 is a schematic diagram of an alternative task processing apparatus based on a distributed system according to an embodiment of the present invention;

FIG. 15 is a schematic diagram of an alternative task processing apparatus based on a distributed system according to an embodiment of the present invention;

FIG. 16 is a schematic diagram of a task processing system based on a distributed system according to an embodiment of the present invention; and FIG. 17 is a structural block diagram of a computer terminal according to an embodiment of the present invention.

DETAILED DESCRIPTION

To enable those skilled in the art to better understand the present invention, embodiments of the present invention are described clearly and completely below with reference to the drawings of embodiments of the invention. Described embodiments are merely some, rather than all of the embodiments of the present invention. On the basis of the embodiments of the present invention, all other embodiments obtained by those of ordinary skill in the art without making creative efforts shall fall within the protection scope of the present invention.

It should be noted that the terms such as "first" and "second" in the specification, the claims, and the aforementioned drawings of the present invention are used to distinguish between similar objects, and are not necessarily used to describe a specific sequence or priority. It should be understood that numbers used in this way are interchangeable in a suitable situation, so that the embodiments of the present invention described herein can be implemented in a sequence in addition to a sequence shown or described herein. In addition, terms such as "include" and "have" and any variation thereof are intended to cover non-exclusive inclusion, for example, processes, methods, systems, products, or apparatuses including a series of steps or units are not necessarily limited to the steps or units that are clearly listed, and may include other steps or units that are not clearly listed or that are inherent to the processes, methods, products, or apparatuses.

First, the following interpretation applies to some nouns or terms appearing in the process of describing embodiments of the present invention:

Distributed system: a distributed system is a software system having a high degree of cohesion and transparency that is built on the network. Cohesion means that each database distribution node is highly autonomous with a local database management system provided therein. Transparency means that each database distribution node is transparent to the user's application; that is, an application cannot tell whether a node is a local or remote node.

Driver: a master device, a service layer (central control) in the distributed execution system, responsible for resource management.

Node: a task processing device, a cluster's machine node in the distributed execution system, also called a gateway, and is specifically responsible for execution of tasks.

Pid: a task process number, saved when starting a proxy process.

Embodiment 1

An embodiment of a task processing method based on a distributed system is further provided according to this embodiment of the present invention. It should be noted that steps shown in the flowcharts in the drawings may be executed in a computer system, such as a set of computer executable instructions. Furthermore, although the logic sequence is shown in the flowcharts, in some cases, the shown or described steps may be executed in a sequence different from the sequence herein.

Figure 2:
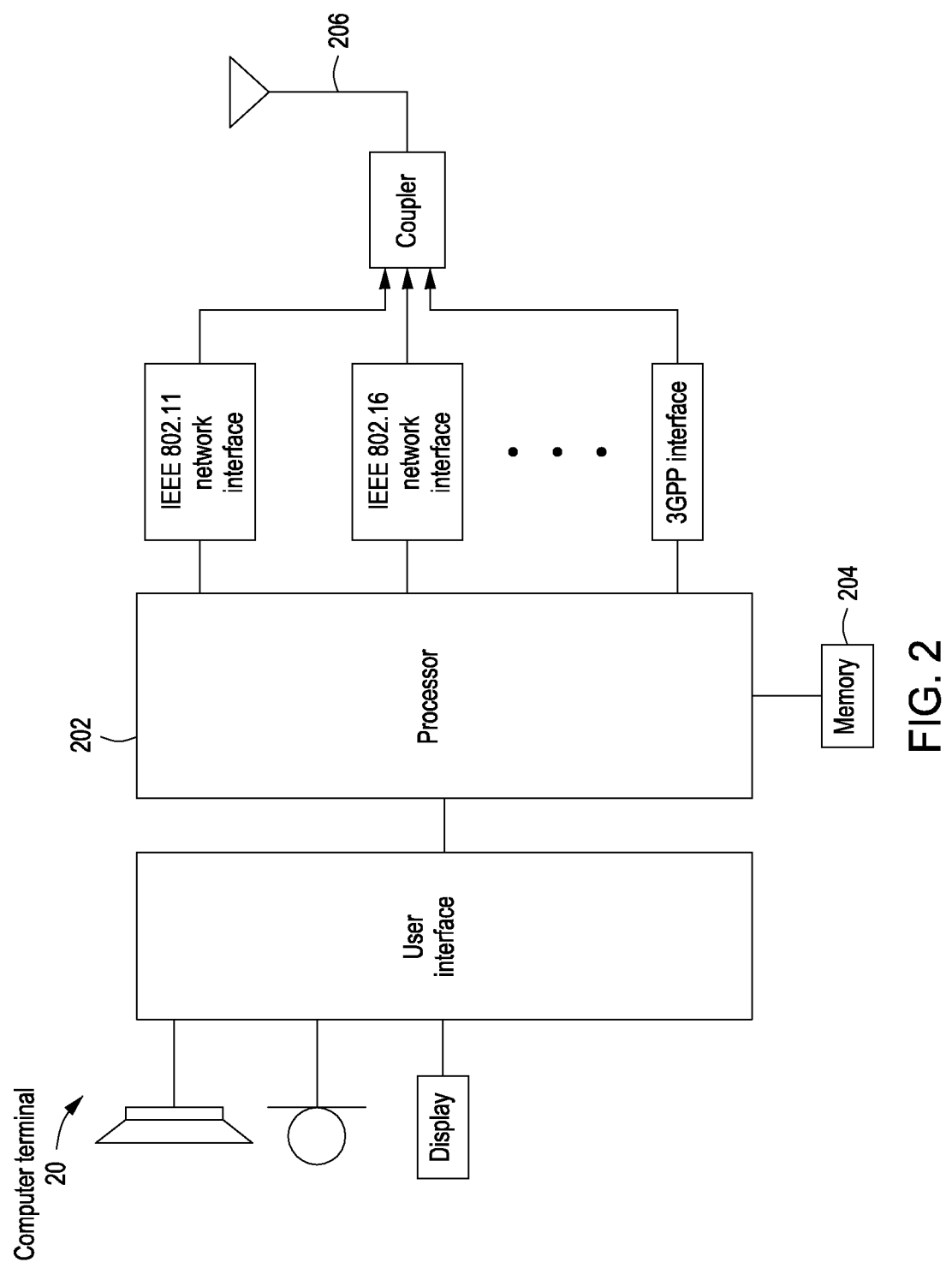

The method of Embodiment 1 of the present invention may be implemented in a mobile terminal, a computer terminal, or a similar computing device. Taking the operation on a computer terminal as an example, FIG. 2 is a block diagram of a hardware structure of a computer terminal for a task processing method based on a distributed system according to an embodiment of the present invention. As shown in FIG. 2, a computer terminal 20 may include one or more (only one shown in the drawing) processors 202 (the processor 202 may include, but is not limited to, a processing apparatus such as a micro processor unit (MCU) or a programmable logic device (FPGA)), a memory 204 configured to store data, and a transmission module 206 configured for a communication function. A person of ordinary skill in the art can understand that the structure shown in FIG. 2 is merely schematic, and is not intended to limit the structure of the electronic device. For example, the computer terminal 20 may further include more or fewer components than those shown in FIG. 2, or have a configuration different from that shown in FIG. 2.

The memory 204 may be configured to store software programs of application software and modules, such as program instructions/modules corresponding to the task processing method based on a distributed system in the embodiments of the present invention; and the processor 202 runs the software programs and modules stored in the memory 204 to execute various function applications and data processing, namely, implementing the aforementioned task processing method based on a distributed system. The memory 204 may include a high-speed random access memory, and may further include a non-volatile memory, such as one or more magnetic storage devices, a flash memory, or other non-volatile solid-state memory. In some examples, the memory 204 may further include memories disposed remotely from the processor 202; and these remote memories may be connected to the computer terminal 20 through a network. Examples of the aforementioned network include, but are not limited to, an internet, an intranet, a local area network, a mobile communication network, and a combination thereof.

A transmission device 206 is configured to receive or send data through a network. A specific example of the aforementioned network may include a wireless network provided by a communication provider of the computer terminal 20. In one example, the transmission device 206 includes a network adapter (network interface controller, NIC), which may communicate with other network apparatuses through a base station, so as to communicate with the Internet. In one example, the transmission device 206 may be a radio frequency (RF) module, configured to communicate with the Internet in a wireless manner.

In the above running environment, the present invention provides a task processing method based on a distributed system shown in FIG. 3. FIG. 3 is a flowchart of a task processing method based on a distributed system according to an embodiment of the present invention. The method shown in FIG. 3 may include the following steps S301 to S305.

Step S301: Obtain, by a task processing device, task information from a master control device by initiating a task request, wherein the task information corresponding to the task request is stored in the master control device.

The task processing device may be a cluster's machine node deployed in the distributed system; the task request may be a http request; the master control device may be a driver; a database of the master control device stores task information required by the task processing device.

It should be noted that tasks in the distributed system are distributed in a resource management layer (a driver layer), and the driver manages nodes and tasks. Lists of tasks being executed on each node are stored in DB of the driver; and a storage period is a task life period.

FIG. 4 is a schematic structural diagram of a distributed execution system according to an embodiment of the present invention. As shown in FIG. 4, in an embodiment, the task processing device actively sends an http request to the master control device. After receiving the http request, the master control device performs the extraction of task information corresponding to the http request, and sends the task information to the task processing device via an interface.

Step S303: Start, by a main process of the task processing device, a corresponding task subprocess by triggering a proxy process for executing the task information after the task information is received.

The above proxy process may be a proxy script serving as a channel between the main process and the task subprocess.

FIG. 5 is a schematic diagram of an alternative task processing device according to an embodiment of the present invention. As shown in FIG. 5, the main process (AlisaNode) in the node of the task processing device is separated from the task subprocess. The proxy process (the Python process), associated with the task subprocess, writes and reads logs. FIG. 6 is a flowchart of a task execution of an alternative task processing device according to an embodiment of the present invention. With reference to FIG. 5 and FIG. 6, in an embodiment, after obtaining a task from the driver, the node starts a proxy process and uploads parameters required by task execution; then the proxy process starts a specific task subprocess to execute task information.

Step S305: Store, by the task processing device, task execution information to a target location through the proxy process, wherein the task execution information comprises one or more of the following pieces of information: a task identifier of the task information, process information of the task subprocess, log information and a return code generated when the task subprocess executes the task information.

In an embodiment, the target location may be a local file of the proxy process; the path may be a task execution path; the task identifier of the task information may be a task id; and the process information of the task subprocess may be a process number pid of the task subprocess.

It should be noted that log information generated by the task subprocess when executing task information is complete log information, which means that log actions are not related to re-startup of the task processing device; moreover, as long as the proxy process exists, logs can be normally read and written.

As shown in FIG. 6, in an embodiment, the task subprocess returns all log information to a proxy server via streams. The proxy process stores the received log information, the process number of the subprocess, the task information pid number, and a return code to local files.

In a solution disclosed by Embodiment 1 of the present invention, a task processing device obtains, from the master control device, task information stored in a master control device by initiating a task request; a main process of the task processing device initiates a corresponding task subprocess by triggering a proxy process for executing the task information after receiving the task information; and the task processing device stores task execution information in a target location through the proxy process.

Because the main process and the task subprocess in the task processing device are isolated with the proxy process, even if the main process is stopped or restarted, the proxy process and the task subprocess are not affected and the task information can be executed normally, thereby achieving the goal of not affecting the execution process that is being executed during the main process startup. Moreover, the task processing device actively obtains task information from the master control device; that is, the task processing device has one-way access to the master control device. Therefore, by changing the http mode and synchronously storing the data in the database, it is possible to resolve the deployment problem of a distributed system where the task processing device and the master control device are not in the same network segment environment. This can support task execution at millions of levels, and can deploy nodes at any time through HTTP, which greatly improves environmental adaptability and extensibility of a system.

Therefore, Embodiment 1 provided in the present invention solves the problem of task loss caused by the fact that the task processing device cannot successfully execute the task information when the distributed execution system is established in a specific application environment.

In the above embodiment of the present invention, after the main process receives the task information in step S303, the above method further includes the following step S307:

Step S307: If the main process is restarted, start a task subprocess offline through the proxy process to execute the task information and save the task execution information offline.

In an embodiment, if the main process of the node is restarted, the proxy process starts the task subprocess offline to execute the task information, and stores the task execution information sent by the task subprocess into local files in an offline storage manner.

Through the above step S307, the main process is restarted, and the proxy process protects a task status by storing the task execution information of the task subprocess offline, so as to achieve the objective of not affecting the task execution and loss of log information after a hot restart of the task processing device.

In the above embodiment of the present invention, after the main process is restarted in step S307, the above method further includes the following steps S311 to S313.

Step S311: Obtain, by the task processing device, at least one piece of task information currently being executed by accessing the master control device, wherein the task information comprises the task identifier and a task execution path.

In an embodiment, the above task execution path can be a globally unique critical path. This path can maintain the life cycle of the entire task. The generation method of the task execution path is: client name+date+random number+task number.

FIG. 7 is a flowchart of recovering task information after a re-startup of an alternative task processing device according to an embodiment of the present invention. As shown in FIG. 7, in an embodiment, the task information stored on the node is in the memory, and the task information is lost after the node is restarted. However, the task subprocess is separated from the main process of the node. After the node is restarted, tasks are executed normally. After the node is recovered, a recover interface is invoked to obtain lists of tasks being executed in the driver (i.e., at least one piece of task information being executed). Each task has a task number and a task execution path.

Step S313: Determine, by the task processing device, executed tasks or not yet executed tasks in the at least one piece of task information when the main process is restarted by inspecting the task execution information recorded in the target location.

A log information interface may be obtained by searching for log files under the task execution path; by searching for the task subprocess files under the task execution path, whether the task information is executed by the task subprocess can be obtained; by searching for return code files under the task execution path, whether the task subprocess completes the execution of the task information can be obtained.

As shown in FIG. 7, in an embodiment, the task processing device determines whether a process number corresponding to the subprocess for each task exists based on the task execution path; if so, the task has been executed; if not, the task should be executed.

The execution of the task information can be kept consistent after the main process is restarted through the above steps S311 to S313: after the main process of the task processing device is restarted, the main process obtains, from the master control device, at least one piece of task information being executed; inspects the task execution information recorded in the target location and determines whether the at least one piece of task information has been executed or not.

In the above embodiment of the present invention, the step S313 where the task processing device determines executed tasks or not yet executed tasks in the at least one piece of task information by inspecting the task execution information recorded in the target location comprises the following steps S3133 to S3135.

Step S3131: Search locally, by the task processing device, in the target location and determine whether process information matching any task identifier exists in the at least one piece of task information;

In an embodiment, the above process information can be a process number of the subprocess. When starting to execute the task information, each task subprocess correspondingly stores its own process number to the task information.

In an embodiment, the task processing device performs the search based on the task execution path, and determines, according to the task identifier, whether any task identifier in the at least one piece of task information has a corresponding process number of the subprocess.

Step S3133: If so, determine that the task information is started and executed by the corresponding task subprocess when the main process is restarted; the task processing device only registers the task information in a memory.

As shown in FIG. 7, in an embodiment, if the process number of the subprocess exists, it means that the task information is started and executed by a corresponding task subprocess, and the task processing device recovers the task information (i.e., registering the task information in the memory) and reads the task process information of the task (i.e., the task execution information).

Step S3135: If not, determine that the task information is not executed by the corresponding task subprocess when the main process is restarted; the task processing device registers the task information in the memory and starts the corresponding task subprocess to execute the task information.

As shown in FIG. 7, in an embodiment, if the process number of the subprocess does not exist, it means that the task information is not executed by a corresponding task subprocess; and the task processing device stores the task information in the memory and starts a corresponding task subprocess to execute the task information by starting a proxy process.

The execution of the task information can be kept consistent after the main process is restarted through the above steps S3133 to S3135: the task processing device searches locally at the target location, and determines whether the process number of the corresponding subprocess exists; if so, re-records the task information; and if not, starts the task subprocess to execute the task information by using the proxy process.

In the above embodiment of the present invention, before the task processing device only registers the task information in the memory in step S3133, the above method further includes the following steps S317 to S319.

Step S315: Search locally, by the task processing device, in the target location and determine whether a return code matching the task information started and executed by the corresponding task subprocess exists.

In an embodiment, the exit code (return code) is used to show that the execution of the task information is completed.

Step S317: If so, determine that the corresponding task subprocess has fully executed the task information when the main process is restarted; the task processing device terminates registering the task information in the memory and directly feeds back the corresponding task log to the master control device.

Step S319: If not, determine that the corresponding task subprocess has not fully executed the task information when the main process is restarted; the task processing device registers the task information in the memory and starts the corresponding task subprocess to re-execute the task information.

In an embodiment, if the task processing device determines that a process number of a corresponding subprocess exists, it is determined whether a return code corresponding to the task information exists; if so, it means that the execution of the task information is completed, and there is no need to register the task information in the memory, and the corresponding task log is directly fed back to the master control device; if not, it means that the execution of the task is not completed, then the corresponding task subprocess is started by the proxy process to re-execute the task information.

Recovering the task information that is being executed after the main process is restarted so as to control the status of the task information can be achieved through the above steps S317 to S319: the task processing device searches locally at the target location and determines whether a corresponding return code exists; if so, feeds back the task log; and if not, starts the corresponding task subprocess to re-execute the task information.

In the above embodiment of the present invention, after the task processing device obtains task information from the master control device by initiating a task request in step S301, the above method further includes the following steps S321 to S323.

Step S321: Extract a path parameter from the task information and generating the task execution path according to the path parameter.

In an embodiment, when obtaining the task information, the task processing device obtains a path parameter from the task information; and the task processing device uses the parameter as a current task execution path and stores the execution log, the process number, and the return code under the path.

Step S323: The proxy process stores the task identifier in the target location according to the task execution path.

In an embodiment, when executing the startup, the task subprocess stores the process number of the current subprocess to local files; and the stored path is the task execution path.

The integrity and checkability of the task log before and after the main process is restarted may be guaranteed through the above steps S321 to S323: the task processing device extracts the path parameter from the task information and generates the task execution path; the proxy process stores the task identifier in the target location according to the task execution path.

In the above embodiment of the present invention, the above method further includes the following step S325.

Step S325: Monitor, by the main process of the task processing device according to the task identifier, whether the task information is started and executed, and monitor, according to the return code, whether the task information is fully executed.

All the task information can be ensured to be executed and the execution is completed through the above step S325: the task processing device may monitor, according to the task identifier and the return code, whether the task information is executed and whether the execution is fully executed.

An embodiment of the present invention is described in detail with reference to FIG. 5, FIG. 7, and FIG. 8.

As shown in FIG. 8, taking the task processing device including the main process, the proxy process, and the task subprocess as an application scenario, an optional task processing method based on a distributed system is provided, and the method may include the following steps S81 to S87.

S801: A client terminal 81 submits a task.

In an embodiment, a client may issue task information by means of the client terminal 81.

S802: A main process of a task processing device 163 obtains task information stored in a master control device 161.

In an embodiment, the main process of the task processing device 163 obtains the task information from the master control device 161 via an http request; and the task information is stored in the master control device.

In this embodiment, the implementation manner of step S802 is consistent with that of step S301 in the above embodiment of the present invention; and details are not described herein again.

S803: The task processing device 163 executes the task information by starting a task subprocess through a proxy process.

In an embodiment, after receiving the task information, the main process of the task processing device 163 starts, by triggering the proxy process, the task subprocess to execute the task information. As shown in FIG. 5, the main process (AlisaNode) in the node of the task processing device is separated from the task subprocess. The proxy process (the Python process), associated with the task subprocess, writes and reads logs.

In this embodiment, the implementation manner of step S803 is consistent with that of step S303 in the above embodiment of the present invention; and details are not described herein again.

S804: The task processing device 163 stores the task information through the proxy process.

In an embodiment, when obtaining the task information, the task processing device 163 obtains a path parameter from the task information and generates a task execution path. The proxy process stores a task identifier of the task information, process information of the task subprocess, log information, and the return code in a target location corresponding to the task execution path.

In this embodiment, the implementation manner of step S804 is consistent with that of step S305 in the above embodiment of the present invention; and details are not described herein again.

S805: The main process is restarted; and the task processing device 163 starts a task subprocess offline through the proxy process to execute the task information and saves the task execution information offline.

In an embodiment, if the main process of the node is restarted, the proxy process starts the task subprocess offline to execute the task information, and stores the task execution information generated by executing the task information through the task subprocess into local files in an offline storage manner. After the main process of the task processing device is restarted, the main process 163 obtains, from the master control device 161, task information that is being executed; searches the task execution information in the target location; and determines whether the task information has been executed or not when the main process is restarted.

As shown in FIG. 7, in an embodiment, after the main process is restarted, the task processing device 163 invokes a recovery interface to obtain the task list stored in the master control device 161; inspects whether a process number corresponding to the task subprocess exists in the target location; if not, it means that the task information is not executed by the corresponding task subprocess, and the task processing device 163 stores the task information in the memory, and starts the corresponding task subprocess to execute the task information, by starting the proxy process; if so, it means that the task information is started and executed by the corresponding task subprocess; the task processing device 163 inspects whether a corresponding return code exists in the target location; if not, starts the corresponding task subprocess to re-execute the task information by starting the proxy process; and if so, returns the task log to the master control device 161.

S806: The task processing device 163 returns a task status to the master control device 161.

In an embodiment, the main process monitors, according to the task identifier, whether the task information is started and executed; and monitors, according to the return code, whether the execution of the task information is completed; if the main process detects that the task is being executed, the task execution information is fed back to the master control device 161; if it is detected that the execution of the task information is completed, the task log is fed back to the master control device 161.

In this embodiment, the implementation manner of step S806 is consistent with that of step S325 in the above embodiment of the present invention; and details are not described herein again.

S807: The master control device 161 feeds back the task log to the client terminal 81.

In an embodiment, the master control device 161 feeds back the task log of the task information having the completed execution to the client; and the task execution information of the task information that is being executed is sent to the client terminal 81.

It should be noted that in order to describe the foregoing method embodiments briefly, all the method embodiments are expressed as a combination of a series of actions, but those skilled in the art should know that the present invention is not limited by the sequence of the described actions because certain steps can adopt other sequences or can be carried out at the same time according to the present invention. Secondly, those skilled in the art should also know that all the embodiments described in the specification belong to preferred embodiments, and the involved actions and modules are not necessarily required by the present invention.

Through the preceding description of embodiments, those skilled in the art will clearly understand that the method according to the aforementioned embodiment may be implemented by software plus a necessary general hardware platform, and certainly may also be implemented by hardware. Based on such understanding, the essence of the technical solutions of the present invention may be embodied in the form of a software product. The computer software product is stored in a storage medium (for example, a ROM/RAM, a magnetic disk, or an optical disc) and includes several instructions for instructing a terminal apparatus (which may be a mobile phone, a computer, a server, a network apparatus, or the like) to perform the methods described in the embodiments of the present invention.

Embodiment 2

According to this embodiment of the present invention, a task processing apparatus based on a distributed system used to implement the task processing method based on a distributed system is further provided. As shown in FIG. 9, the device includes: a first obtaining module 91, a first execution module 93, and a first storage module 95.

The first obtaining module 91 is configured to be used by a task processing device to obtain task information from a master control device by the task processing device initiating a task request, wherein the task information corresponding to the task request is stored in the master control device. The first execution module 93 is configured to be used by a main process of the task processing device to start a corresponding task subprocess by triggering a proxy process for executing the task information after receiving the task information. The first storage module 95 is configured to be used by the task processing device to store task execution information to a target location through the proxy process, wherein the task execution information comprises one or more of the following pieces of information: a task identifier of the task information, process information of the task subprocess, log information and a return code generated when the task subprocess executes the task information.

In an embodiment, the task processing device may be a cluster's machine node deployed in the distributed system; the task request may be a http request; the master control device may be a driver; a database of the master control device stores task information required by the task processing device. The above proxy process may be a proxy script serving as a channel between the main process and the task subprocess. The target location may be a local file of the proxy process; the path may be a task execution path; the task identifier of the task information may be a task id; and the process information of the task subprocess may be a process number pid of the task subprocess.

It should be noted that tasks in the distributed system are distributed in a resource management layer (a driver layer); and the driver manages nodes and tasks. Lists of tasks being executed on each node are stored in DB of the driver; and a storage period is a task life period. The log information generated by the task subprocess when executing task information is complete log information, which means that log actions are not related to re-startup of the task processing device; moreover, as long as the proxy process exists, logs can be normally read and written.

It should be noted here that the first obtaining module 91, the first execution module 93, and the first storage module 95 correspond to step S301 to step S305 in Embodiment 1; and the three modules and their corresponding steps implement the same examples and are applied in the same scenario, which are, however, not limited to the content disclosed in Embodiment 1. It should be noted that the modules, as parts of the apparatus, can be operated in the computer terminal 20 provided in Embodiment 1.

In a solution disclosed by Embodiment 2 of the present invention, a task processing device obtains, from the master control device, task information stored in a master control device by initiating a task request; a main process of the task processing device initiates a corresponding task subprocess by triggering a proxy process for executing the task information after receiving the task information; and the task processing device stores task execution information in a target location through the proxy process.

It is easy to notice that because the main process and the task subprocess in the task processing device are isolated with the proxy process, even if the main process is stopped or restarted, the proxy process and the task subprocess are not affected and the task information can be executed normally, thereby achieving the goal of not affecting the execution process that is being executed during the main process startup. Moreover, the task processing device actively obtains task information from the master control device; that is, the task processing device has one-way access to the master control device. Therefore, by changing the http mode and synchronously storing the data in the database, it is possible to resolve the deployment problem of a distributed system where the task processing device and the master control device are not in the same network segment environment. This can support task execution at millions of levels, and can deploy nodes at any time through HTTP, which greatly improves environmental adaptability and extensibility of a system.

Therefore, the solution of Embodiment 2 provided in the present invention solves the problem of task loss caused by the fact that the task processing device cannot successfully execute the task information when the distributed execution system is established in a specific application environment.

In the above embodiment of the present invention as shown in FIG. 10, the above apparatus further includes: a second execution module 101.

The second execution module 101 is configured to do the following: after the main process receives the task information, if the main process is restarted, start the task subprocess offline through the proxy process to execute the task information and save the task execution information offline.

It should be noted here that the second execution module 101 corresponds to step S307 in Embodiment 1; and the module and corresponding steps implement the same examples and are applied in the same scenario, which are, however, not limited to the content disclosed in Embodiment 1. It should be noted that the modules, as parts of the apparatus, can be operated in the computer terminal 20 provided in Embodiment 1.

In the above embodiment of the present invention as shown in FIG. 11, the above apparatus further includes: a second obtaining module 111 and a first determining module 113.

The second obtaining module 111 is configured to be used by the task processing device to obtain at least one piece of task information currently being executed through the task processing device accessing the master control device, wherein the task information comprises the task identifier and a task execution path. The first determining module 113 is configured to be used by the task processing device to determine executed tasks or not yet executed tasks in the at least one piece of task information when the main process is restarted through the task processing device inspecting the task execution information recorded in the target location.

In an embodiment, the above task execution path can be a globally unique critical path. This path can maintain the life cycle of the entire task. The generation method of the task execution path is: client name+date+random number+task number. A log information interface may be obtained by searching for log files under the task execution path; by searching for the task subprocess files under the task execution path, whether the task information is executed by the task subprocess can be obtained; by searching for return code files under the task execution path, whether the task subprocess completes the execution of the task information can be obtained.

It should be noted here that the second obtaining module 111 and the first determining module 113 correspond to step S311 to step S313 in Embodiment 1; and the two modules and their corresponding steps implement the same examples and are applied in the same scenario, which are, however, not limited to the content disclosed in Embodiment 1. It should be noted that the modules, as parts of the apparatus, can be operated in the computer terminal 20 provided in Embodiment 1.

In the above embodiment of the present invention as shown in FIG. 12, the first determining module 113 includes: a second determining module 121, a first registering module 123, and a second registering module 125.

The second determining module 121 is configured to be used by the task processing device to search locally in the target location and determine whether process information matching any task identifier exists in the at least one piece of task information. The first registering module 123 is configured to do the following: if process information matching any task identifier exists in the at least one piece of task information, determine that the task information is started and executed by the corresponding task subprocess when the main process is restarted; the task processing device only registers the task information in a memory. The second registering module 125 is configured to do the following: if process information matching any task identifier does not exist in the at least one piece of task information, determine that the task information is not executed by the corresponding task subprocess when the main process is restarted; the task processing device registers the task information in the memory and starts the corresponding task subprocess to execute the task information.

In an embodiment, the above process information can be a process number of the subprocess. When starting to execute the task information, each task subprocess correspondingly stores its own process number to the task information.

It should be noted here that the second determining module 121, the first registering module 123, and the second registering module 125 correspond to step S3133 to step S3135 in Embodiment 1; and the three modules and their corresponding steps implement the same examples and are applied in the same scenario, which are, however, not limited to the content disclosed in Embodiment 1. It should be noted that the modules, as parts of the apparatus, can be operated in the computer terminal 20 provided in Embodiment 1.

Figure 13:
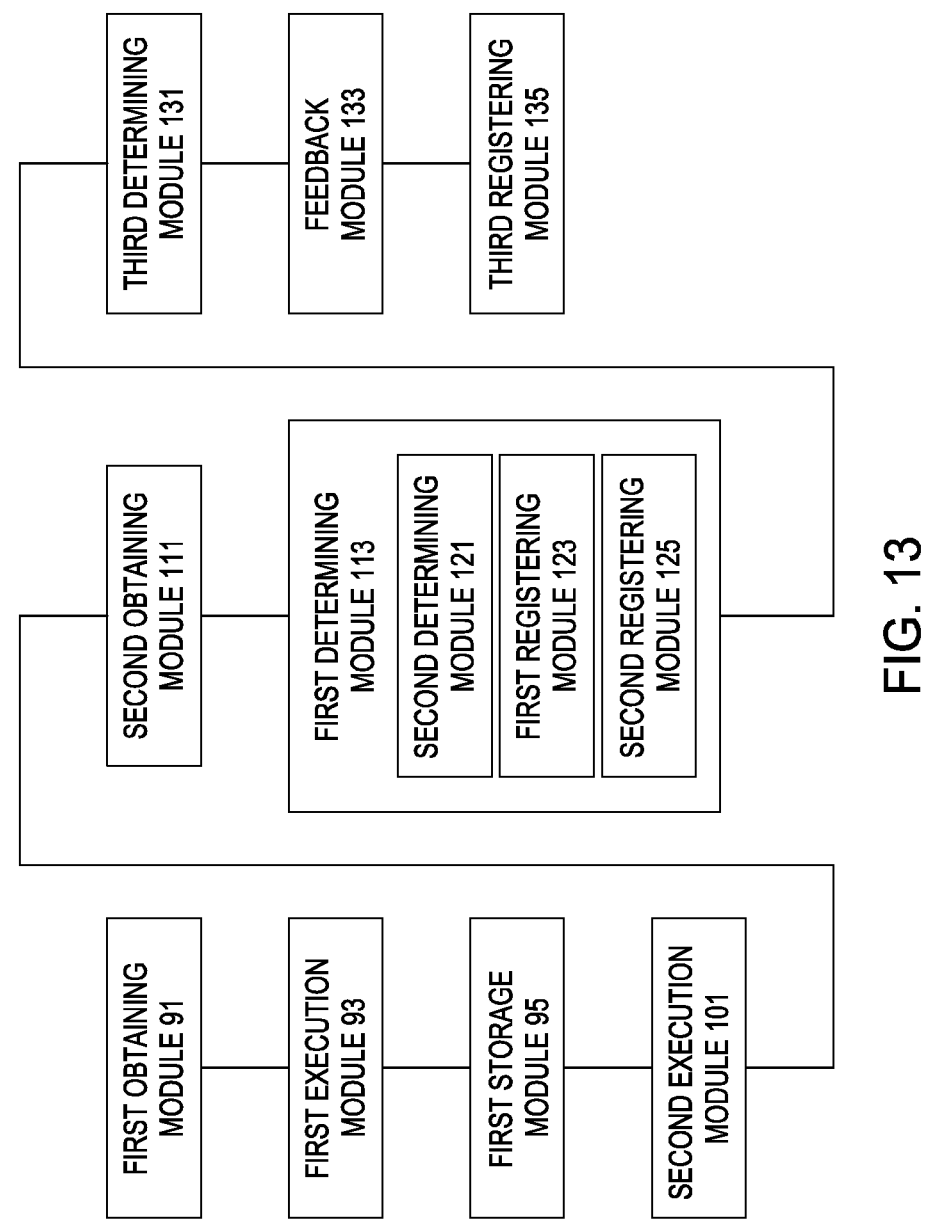

In the above embodiment of the present invention as shown in FIG. 13, the above apparatus further includes: a third determining module 131, a feedback module 133, and a third registering module 135.

The third determining module 131 is configured to be used by the task processing device to search locally in the target location and determines whether a return code matching the task information started and executed by the corresponding task subprocess exists. The feedback module 133 is configured to do the following: if a return code matching the task information started and executed by the corresponding task subprocess exists, determines that the corresponding task subprocess has fully executed the task information when the main process is restarted; the task processing device terminates registering the task information in the memory and directly feeds back the corresponding task log to the master control device. The third registering module 135 is configured to do the following: if a return code matching the task information started and executed by the corresponding task subprocess does not exist, determine that the corresponding task subprocess has not fully executed the task information when the main process is restarted; the task processing device registers the task information in the memory and starts the corresponding task subprocess to re-execute the task information.

In an embodiment, the exit code (return code) is used to show that the execution of the task information is completed.

It should be noted here that the third determining module 131, the feedback module 133, and the third registering module 135 correspond to step S317 to step S319 in Embodiment 1; and the three modules and their corresponding steps implement the same examples and are applied in the same scenario, which are, however, not limited to the content disclosed in Embodiment 1. It should be noted that the modules, as parts of the apparatus, can be operated in the computer terminal 20 provided in Embodiment 1.

Figure 14:
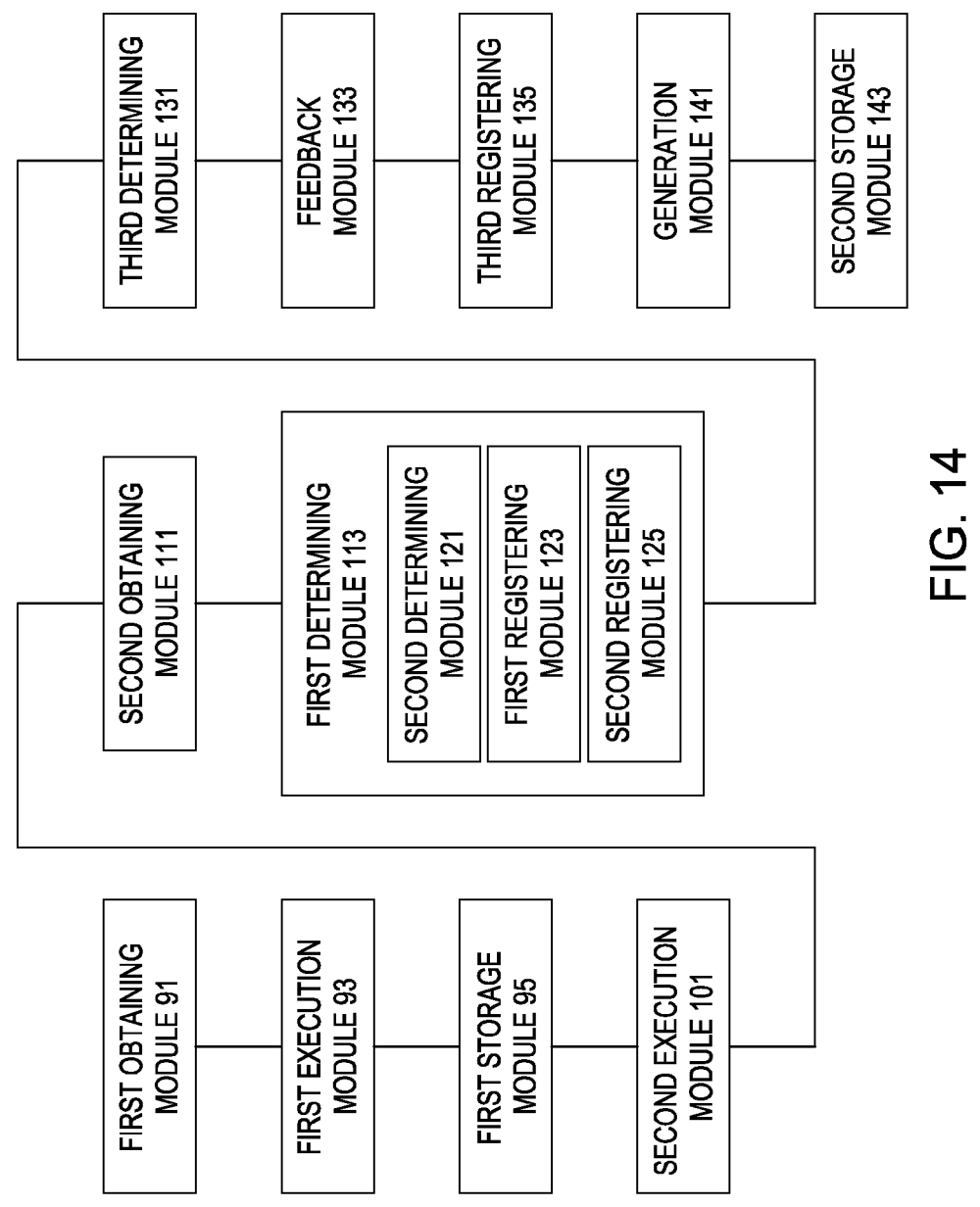

In the above embodiment of the present invention as shown in FIG. 14, the above apparatus further includes: a generation module 141 and a second storage module 143.

The generation module 141 is configured to extract a path parameter from the task information and generate the task execution path according to the path parameter. The second storage module 143 is configured to be used by the proxy process to store the task identifier to the target location according to the task execution path.

It should be noted here that the generation module 141 and the second storage module 143 correspond to step S321 to step S323 in Embodiment 1; and the two modules and their corresponding steps implement the same examples and are applied in the same scenario, which are, however, not limited to the content disclosed in Embodiment 1. It should be noted that the modules, as parts of the apparatus, can be operated in the computer terminal 20 provided in Embodiment 1.

Figure 15:
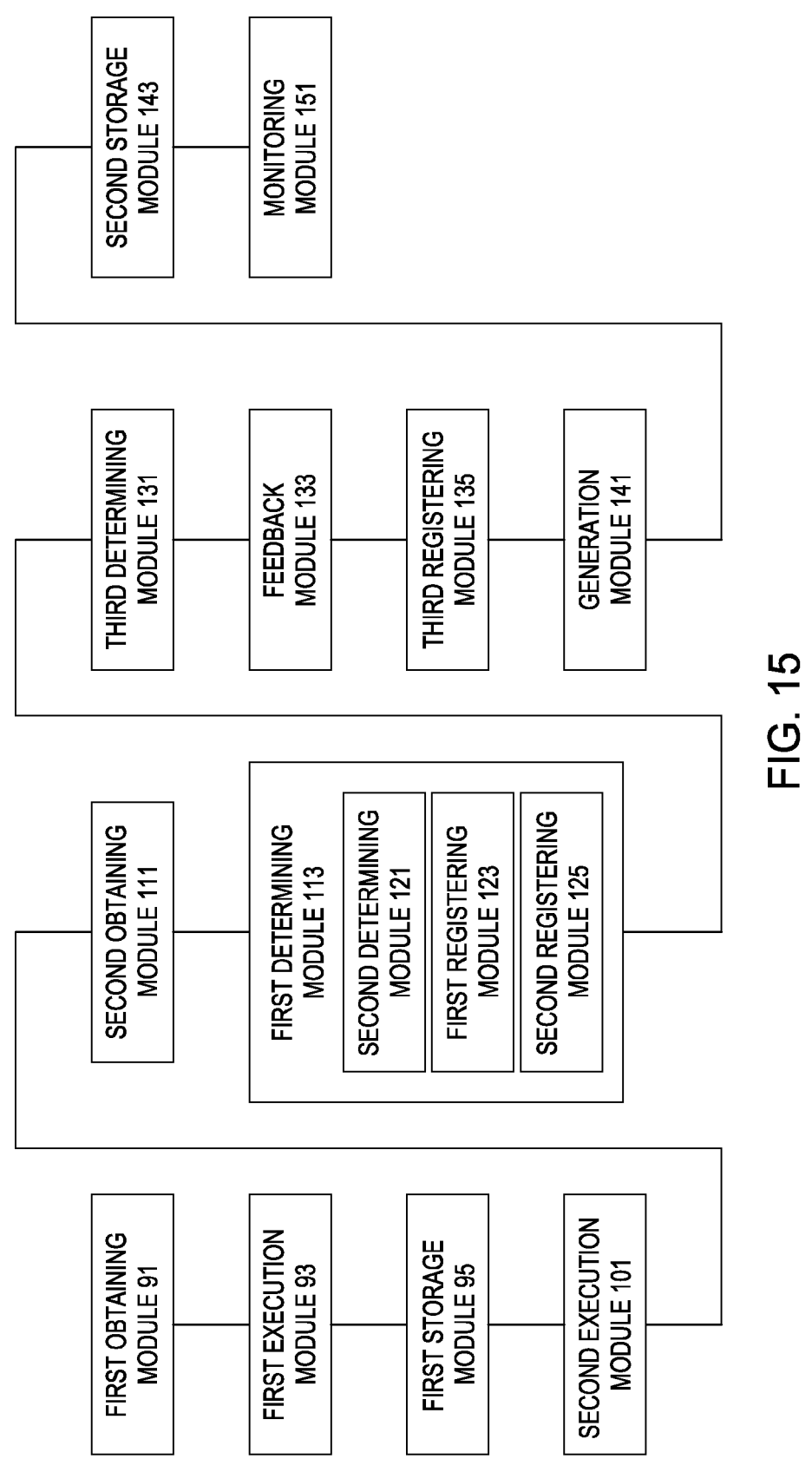

In the above embodiment of the present invention as shown in FIG. 15, the above apparatus further includes: a monitoring module 151.

The monitoring module 151 is configured to be used by the main process of the task processing device to monitor, according to the task identifier, whether the task information is started and executed, and monitor, according to the return code, whether the task information is fully executed.

It should be noted here that the monitoring module 151 corresponds to step S325 in Embodiment 1; and the module and corresponding steps implement the same examples and are applied in the same scenario, which are, however, not limited to the content disclosed in Embodiment 1. It should be noted that the modules, as parts of the apparatus, can be operated in the computer terminal 20 provided in Embodiment 1.

Embodiment 3

According to this embodiment of the present invention, a task processing system based on a distributed system used to implement the task processing method based on a distributed system is further provided. As shown in FIG. 16, the system includes: a master control device 161 and a task processing device 163.

The master control device 161 is configured to store task information.

The task processing device 163, communicates with the master control device and is configured to obtain task information from the master control device by initiating a task request, wherein the task information corresponding to the task request is stored in the master control device.

In an embodiment, the task processing device 163 may be a cluster's machine node deployed in the distributed system; the task request may be a http request; the master control device may be a driver; a database of the master control device stores task information required by the task processing device.

It should be noted that tasks in the distributed system are distributed in a resource management layer (a driver layer); and the driver manages nodes and tasks. Lists of tasks being executed on each node are stored in DB of the driver; and a storage period is a task life period.

As shown in FIG. 3, in an embodiment, the task processing device actively sends an http request to the master control device. After receiving the http request, the master control device performs the extraction of task information corresponding to the http request, and sends the task information to the task processing device via an interface.

The task processing device 163 is further configured to start a corresponding task subprocess by triggering a proxy process for executing the task information after a main process of the task processing device receives the task information.

In an embodiment, the above proxy process may be a proxy script serving as a channel between the main process and the task subprocess.

As shown in FIG. 5, the main process (AlisaNode) in the node of the task processing device is separated from the task subprocess. The proxy process (the Python process), associated with the task subprocess, writes and reads logs. With reference to FIG. 5 and FIG. 6, in an embodiment, after obtaining a task from the driver, the node starts a proxy process and uploads parameters required by task execution; then the proxy process starts a specific task subprocess to execute task information.

The task processing device 163 is further configured to store task execution information to a target location through the proxy process, wherein the task execution information comprises one or more of the following pieces of information: a task identifier of the task information, process information of the task subprocess, log information and a return code generated when the task subprocess executes the task information.

In an embodiment, the target location may be a local file of the proxy process; the path may be a task execution path; the task identifier of the task information may be a task id; and the process information of the task subprocess may be a process number pid of the task subprocess.

It should be noted that log information generated by the task subprocess when executing task information is complete log information, which means that log actions are not related to re-startup of the task processing device; moreover, as long as the proxy process exists, logs can be normally read and written.

As shown in FIG. 6, in an embodiment, the task subprocess returns all log information to a proxy server via streams. The proxy process stores the received log information, the process number of the subprocess, the task information pid number, and a return code to local files.

In a solution disclosed by embodiment 3 of the present invention, a task processing device obtains, from the master control device, task information stored in a master control device by initiating a task request; a main process of the task processing device initiates a corresponding task subprocess by triggering a proxy process for executing the task information after receiving the task information; and the task processing device stores task execution information in a target location through the proxy process.

Because the main process and the task subprocess in the task processing device are isolated with the proxy process, even if the main process is stopped or restarted, the proxy process and the task subprocess are not affected and the task information can be executed normally, thereby achieving the goal of not affecting the execution process that is being executed during the main process startup. Moreover, the task processing device actively obtains task information from the master control device; that is, the task processing device has one-way access to the master control device. Therefore, by changing the http mode and synchronously storing the data in the database, it is possible to resolve the deployment problem of a distributed system where the task processing device and the master control device are not in the same network segment environment. This can support task execution at millions of levels, and can deploy nodes at any time through HTTP, which greatly improves environmental adaptability and extensibility of a system.

Therefore, the solution of Embodiment 3 provided in the present invention solves the problem of task loss caused by the fact that the task processing device cannot successfully execute the task information when the distributed execution system is established in a specific application environment.

In an embodiment, after the main process receives the task information, the task processing device 163 is configured to do the following: if the main process is restarted, start a task subprocess offline through the proxy process to execute the task information and save the task execution information offline.

In an embodiment, after the main process is restarted, the task processing device 163 is further configured to obtain at least one piece of task information that is currently being executed by accessing the master control device, wherein the task information includes a task identifier and a task execution path; and determine executed tasks or not yet executed tasks in the at least one piece of task information when the main process is restarted through the task processing device inspecting the task execution information recorded in the target location.

In an embodiment, the task processing device 163 determines whether process information matching any task identifier exists in the at least one piece task information by searching locally at the target location; if so, determine that the task information is started and executed by a corresponding task subprocess when the main process is restarted; the task processing device only registers the task information in a memory; and if not, determine that the task information is not fully executed by the corresponding task subprocess when the main process is restarted; the task processing device registers the task information in the memory and starts the corresponding task subprocess to execute the task information.

In an embodiment provided by the present invention, the task processing device 163 is further configured to determine whether a return code matching the task information started and executed by the corresponding task subprocess exists; if so, determine that the corresponding task subprocess has fully executed the task information when the main process is restarted; the task processing device terminates registering the task information in the memory and directly feeds back the corresponding task log to the master control device; and if not, determine that the corresponding task subprocess has not fully executed the task information when the main process is restarted; the task processing device registers the task information in the memory and starts the corresponding task subprocess to re-execute the task information.

In an embodiment provided by the present invention, the task processing device 163 is further configured to extract a path parameter from the task information and generate a task execution path according to the path parameter, wherein the proxy process stores the task identifier in the target location according to the task execution path.

In an embodiment provided by the present invention, the task processing device 163 is further configured to be used by the main process to monitor, according to the task identifier, whether the task information is started and executed, and monitor, according to the return code, whether the task information is fully executed.

Embodiment 4

An embodiment of the present invention may provide a computer terminal, wherein the computer terminal may be any computer terminal apparatus in a computer terminal group. In an embodiment, in this embodiment, the aforementioned computer terminal may also be replaced with a terminal apparatus such as a mobile terminal.

In an embodiment, the aforementioned computer terminal may be at least one network apparatus in multiple network apparatuses located in a computer network.

In this embodiment, the computer terminal may execute program codes of the following steps in the task processing method based on a distributed system: obtaining, by a task processing device, task information from a master control device by initiating a task request, wherein the task information corresponding to the task request is stored in the master control device; starting, by a main process of the task processing device, a corresponding task subprocess by triggering a proxy process for executing the task information after receiving the task information; and storing, by the task processing device, task execution information to a target location through the proxy process, wherein the task execution information comprises one or more of the following pieces of information: a task identifier of the task information, process information of the task subprocess, log information and a return code generated when the task subprocess executes the task information.

Figure 17:
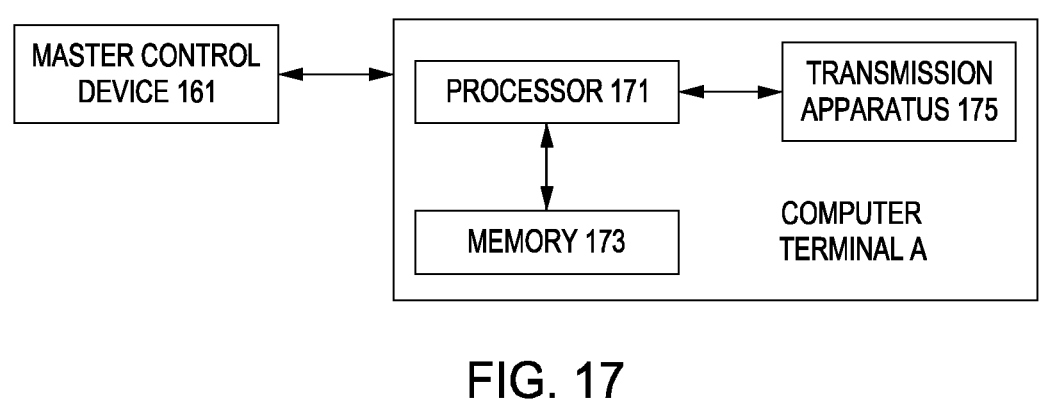

FIG. 17 is a structural block diagram of a computer terminal according to an embodiment of the present invention. As shown in FIG. 17, the computer terminal A may include: one or more (only one is shown in the drawings) processors 171, a memory 173, and a transmission apparatus 175.

The memory 173 may be configured to store software programs of application software and modules, such as program instructions/modules corresponding to the task processing method and apparatus based on a distributed system in the embodiments of the present invention; and the processor 171 runs the software programs and modules stored in the memory to execute various function applications and data processing, namely, implementing the aforementioned task processing method based on a distributed system. The memory 173 may include a high-speed random access memory, and may further include a non-volatile memory, such as one or more magnetic storage devices, a flash memory, or other non-volatile solid-state memory. In some examples, the memory 173 may further include memories disposed remotely from the processor; and these remote memories may be connected to a terminal A through a network. Examples of the aforementioned network include, but are not limited to, an interne, an intranet, a local area network, a mobile communication network, and a combination thereof.

The processor 171 may invoke information and applications stored in the memory via the transmission apparatus to execute the following steps: obtaining, by a task processing device, task information from a master control device by initiating a task request, wherein the task information corresponding to the task request is stored in the master control device; starting, by a main process of the task processing device, a corresponding task subprocess by triggering a proxy process for executing the task information after receiving the task information; and storing, by the task processing device, task execution information to a target location through the proxy process, wherein the task execution information comprises one or more of the following pieces of information: a task identifier of the task information, process information of the task subprocess, log information and a return code generated when the task subprocess executes the task information.

The processor 171 may also execute program codes of the following steps: after the main process receives the task information, if the main process is restarted, start the task subprocess offline through the proxy process to execute the task information and save the task execution information offline.

The processor 171 may execute program codes of the following steps: the task processing device obtains at least one piece of task information that is currently being executed by accessing the master control device, wherein the task information includes a task identifier and a task execution path; and determine executed tasks or not yet executed tasks in the at least one piece of task information when the main process is restarted through the task processing device inspecting the task execution information recorded in the target location.

The processor 171 may execute program codes of the following steps: the task processing device determines whether process information matching any task identifier exists in the at least one piece task information by searching locally at the target location; if so, determine that the task information is started and executed by a corresponding task subprocess when the main process is restarted; the task processing device only registers the task information in a memory; and if not, determine that the task information is not fully executed by the corresponding task subprocess when the main process is restarted; the task processing device registers the task information in the memory and starts the corresponding task subprocess to execute the task information.

The processor 171 may execute program codes of the following steps: the task processing device determines whether a return code matching the task information started and executed by the corresponding task subprocess exists; if so, determine that the corresponding task subprocess has fully executed the task information when the main process is restarted; the task processing device terminates registering the task information in the memory and directly feeds back the corresponding task log to the master control device; and if not, determine that the corresponding task subprocess has not fully executed the task information when the main process is restarted; the task processing device registers the task information in the memory and starts the corresponding task subprocess to re-execute the task information.

The processor 171 may execute program codes of the following steps: extract a path parameter from the task information and generate a task execution path according to the path parameter, wherein the proxy process stores the task identifier in the target location according to the task execution path.

The processor 171 may execute program codes of the following steps: the main process of the task processing device monitors, according to the task identifier, whether the task information is started and executed, and monitor, according to the return code, whether the task information is fully executed.

A task processing method based on a distributed system is provided by this embodiment of the present invention. The task processing device obtains, from the master control device, task information stored in a master control device by initiating a task request; a main process of the task processing device initiates a corresponding task subprocess by triggering a proxy process for executing the task information after receiving the task information; and the task processing device stores task execution information in a target location through the proxy process, which solves the problem of task loss caused by the fact that the task processing device cannot successfully execute the task information when the distributed execution system is established in a specific application environment.

Those of ordinary skill in the art will understand that the structure shown in FIG. 17 is merely schematic. The computer terminal may also be a smart phone (e.g., an Android mobile phone, an iOS mobile phone, and the like), a tablet computer, a palmtop computer, and a terminal device such as mobile Internet devices (MIDs) and a PAD. FIG. 17 poses no limitation on the structure of the aforementioned electronic device. For example, the computer terminal A may further include more or fewer components (for example, a network interface or a display device) than those shown in FIG. 17, or have a different configuration from that shown in FIG. 17.

Those of ordinary skill in the art will understand that all or part of the steps in various methods according to the aforementioned embodiments may be implemented by a program instructing relevant hardware of a terminal apparatus. The program may be stored in a computer readable storage medium. The storage medium may comprise: a flash drive, a read-only memory (ROM), a random access memory (RAM), a magnetic disk, an optical disc, or the like.

Embodiment 5

An embodiment of the present invention further provides a storage medium. In this embodiment, the aforementioned storage medium may be used for storing program code executed by the task processing method based on a distributed system provided in the aforementioned Embodiment 1.

In an embodiment, the aforementioned storage medium may be located in any computer terminal in a computer terminal group in a computer network, or located in any mobile terminal in a mobile terminal group.

In this embodiment, the storage medium is configured to store program codes used to execute the following steps: obtaining, by a task processing device, task information from a master control device by initiating a task request, wherein the task information corresponding to the task request is stored in the master control device; starting, by a main process of the task processing device, a corresponding task subprocess by triggering a proxy process for executing the task information after receiving the task information; and storing, by the task processing device, task execution information to a target location through the proxy process, wherein the task execution information comprises one or more of the following pieces of information: a task identifier of the task information, process information of the task subprocess, log information and a return code generated when the task subprocess executes the task information.

In this embodiment, the storage medium is configured to store program codes used to execute the following steps: after the main process receives the task information, if the main process is restarted, start the task subprocess offline through the proxy process to execute the task information and save the task execution information offline.

In this embodiment, the storage medium is configured to store program codes used to execute the following steps: the task processing device obtains at least one piece of task information that is currently being executed by accessing the master control device, wherein the task information includes a task identifier and a task execution path; and determine executed tasks or not yet executed tasks in the at least one piece of task information when the main process is restarted through the task processing device inspecting the task execution information recorded in the target location.

In this embodiment, the storage medium is configured to store program codes used to execute the following steps: the task processing device determines whether process information matching any task identifier exists in the at least one piece task information by searching locally at the target location; if so, determine that the task information is started and executed by a corresponding task subprocess when the main process is restarted; the task processing device only registers the task information in a memory; and if not, determine that the task information is not fully executed by the corresponding task subprocess when the main process is restarted; the task processing device registers the task information in the memory and starts the corresponding task subprocess to execute the task information.

In this embodiment, the storage medium is configured to store program codes used to execute the following steps: the task processing device determines whether a return code matching the task information started and executed by the corresponding task subprocess exists; if so, determine that the corresponding task subprocess has fully executed the task information when the main process is restarted; the task processing device terminates registering the task information in the memory and directly feeds back the corresponding task log to the master control device; and if not, determine that the corresponding task subprocess has not fully executed the task information when the main process is restarted; the task processing device registers the task information in the memory and starts the corresponding task subprocess to re-execute the task information.

In this embodiment, the storage medium is configured to store program codes used to execute the following steps: extract a path parameter from the task information and generate a task execution path according to the path parameter, wherein the proxy process stores the task identifier in the target location according to the task execution path.

In this embodiment, the storage medium is configured to store program codes used to execute the following steps: the main process of the task processing device monitors, according to the task identifier, whether the task information is started and executed, and monitor, according to the return code, whether the task information is fully executed.

The aforementioned sequence numbers of the embodiments of the present invention are merely for the convenience of description, and do not imply the preference among the embodiments.

In the aforementioned embodiments of the present invention, the description of each embodiment has its own emphasis, and for a part that is not detailed in a certain embodiment, reference can be made to the relevant description of other embodiments.

In a few embodiments provided in the present invention, it should be understood that the disclosed technical contents may be implemented in other manners. The apparatus embodiment described in the foregoing is merely schematic. For example, the division of units is merely division of logic functions, and in fact, there may be other division manners during implementation, for example, multiple units or components may be combined or may be integrated into another system, or some features may be omitted or not be executed. In addition, the displayed or discussed mutual couplings or direct couplings or communication connections may be implemented through some interfaces, and the indirect couplings or communication connections between units or modules may be implemented in electrical or other forms.

The units described as separate parts may be or may not be physically separate, and the parts shown as units may be or may not be physical units, and not only can be located in one place, but also can be distributed onto multiple network units. Part or all of the units can be chosen to implement the purpose of the solutions of this embodiment according to actual requirements.

In addition, respective functional units in respective embodiments of the present invention may be integrated into one processing unit, or respective units may physically exist alone, or two or more units may be integrated into one unit. The integrated unit can be implemented in the form of hardware or in the form of a software functional unit.

When implemented in the form of a software functional unit and sold or used as a separate product, the integrated unit may be stored in a computer readable storage medium. Based on such understanding, the essence of the technical solutions of the present invention, or all or part of the technical solutions may be embodied in the form of a software product. The computer software product is stored in a storage medium and includes several instructions for instructing a computer apparatus (which may be a personal computer, a server, a network apparatus, or the like) to perform all or part of the steps in the methods described in the embodiments of the present invention. The foregoing storage medium comprises: various media capable of storing program code, such as a USB flash drive, a read-only memory (ROM), a random access memory (RAM), a mobile hard disk, a magnetic disk, or an optical disc.

The above descriptions are preferred embodiments of the present invention. It should be pointed out that those of ordinary skill in the art may make improvements and modifications without departing from the scope of the present invention, and the improvements and modifications should also be construed as falling within the protection scope of the present claims.

The invention claimed is:

1. A task processing method based on a distributed system, the method comprising:
    obtaining, by a main process of a task processing device, task information from a master control device by initiating a task request, wherein the task information corresponding to the task request is stored in the master control device;
    in response to obtaining, by the main process of the task processing device, the task information from the master control device, starting, by the main process, a corresponding task subprocess, in the task processing device, by triggering a proxy process, in the task processing device, for executing the task information; and
    storing, by the task processing device, task execution information to a target location through the proxy process, wherein the task execution information comprises one or more of the following pieces of information:
    a task identifier of the task information,
    process information of the task subprocess,
    log information, and
    a return code generated when the task subprocess executes the task information.

2. The method according to claim 1, wherein after the main process obtains the task information, if the main process is restarted, starting the task subprocess offline through the proxy process to execute the task information and saving the task execution information offline.

3. The method according to claim 2, wherein after the main process is restarted, the method further comprises:
    obtaining, by the task processing device, at least one piece of task information currently being executed by accessing the master control device, wherein the task information comprises the task identifier and a task execution path; and
    determining, by the task processing device, executed tasks or not yet executed tasks in the at least one piece of task information when the main process is restarted by inspecting the task execution information recorded in the target location.

4. The method according to claim 3, wherein the determining, by the task processing device, executed tasks or not yet executed tasks in the at least one piece of task information by inspecting the task execution information recorded in the target location comprises:
    searching locally, by the task processing device, in the target location and determining whether the process information matching any task identifier exists in the at least one piece of task information;
    in response to determining that the process information matching any task identifier exists, determining that the task information is started and executed by the corresponding task subprocess when the main process is restarted, the task processing device only registers the task information in a memory; and
    in response to determining that the process information matching any task identifier does not exist, determining that the task information is not executed by the corresponding task subprocess when the main process is restarted, the task processing device registers the task information in the memory and starts the corresponding task subprocess to execute the task information.

5. The method according to claim 4, wherein before the task processing device registers the task information in the memory, the method further comprises:
    searching locally, by the task processing device, in the target location and determining whether a return code matching the task information started and executed by the corresponding task subprocess exists;
    in response to determining that the return code matching the task information started and executed by the corresponding task subprocess exists, determining that the corresponding task subprocess has fully executed the task information when the main process is restarted, the task processing device terminates registering the task information in the memory and directly feeds back a corresponding task log to the master control device; and
    in response to determining that the return code matching the task information started and executed by the corresponding task subprocess does not exist, determining that the corresponding task subprocess has not fully executed the task information when the main process is restarted, the task processing device registers the task information in the memory and starts the corresponding task subprocess to re-execute the task information.

6. The method according to claim 3, wherein after obtaining, by the task processing device, the task information from the master control device by initiating the task request, the method further comprises:
    extracting a path parameter from the task information and generating the task execution path according to the path parameter,
    wherein the proxy process stores the task identifier to the target location according to the task execution path.

7. The method according to claim 1, wherein the main process of the task processing device monitors, according to the task identifier, whether the task information is started and executed, and monitors, according to the return code, whether the task information is fully executed.

8. A task processing apparatus based on a distributed system, the apparatus comprising:
a first obtaining module, configured to be used by a main process of a task processing device to obtain task information from a master control device by initiating a task request, wherein the task information corresponding to the task request is stored in the master control device;
a first execution module, configured to be used by the main process of the task processing device, in response to obtaining by the main process of the task processing device, the task information from the master control device, to start a corresponding task subprocess, in the task processing device, by triggering a proxy process, in the task processing device, for executing the task information; and
a first storage module, configured to be used by the task processing device to store task execution information to a target location through the proxy process,
wherein the task execution information comprises one or more of the following pieces of information: a task identifier of the task information, process information of the task subprocess, log information, and a return code generated when the task subprocess executes the task information.

9. The apparatus according to claim 8, wherein the apparatus further comprises:
a second execution module, configured to do the following: after the main process obtains the task information, if the main process is restarted, start the task subprocess offline through the proxy process to execute the task information and save the task execution information offline.

10. The apparatus according to claim 9, wherein the apparatus further comprises:
a second obtaining module, configured to be used by the task processing device to obtain at least one piece of task information currently being executed through the task processing device accessing the master control device, wherein the task information comprises the task identifier and a task execution path; and
a first determining module, configured to be used by the task processing device to determine executed tasks or not yet executed tasks in the at least one piece of task information when the main process is restarted through the task processing device by inspecting the task execution information recorded in the target location.

11. The apparatus according to claim 10, wherein the first determining module comprises:
a second determining module, configured to be used by the task processing device to search locally in the target location and determine whether process information matching any task identifier exists in the at least one piece of task information;
a first registering module, configured to do the following: if the process information matching any task identifier exists in the at least one piece of task information, determine that the task information is started and executed by the corresponding task subprocess when the main process is restarted, the task processing device only registers the task information in a memory; and
a second registering module, configured to do the following: if the process information matching any task identifier does not exist in the at least one piece of task information, determine that the task information is not executed by the corresponding task subprocess when the main process is restarted, the task processing device registers the task information in the memory and starts the corresponding task subprocess to execute the task information.

12. The apparatus according to claim 11, wherein the apparatus further comprises:
a third determining module, configured to be used by the task processing device to search locally in the target location and determine whether a return code matching the task information started and executed by the corresponding task subprocess exists;
a feedback module, configured to do the following: if the return code matching the task information started and executed by the corresponding task subprocess exists, determine that the corresponding task subprocess has fully executed the task information when the main process is restarted, the task processing device terminates registering the task information in the memory and directly feeds back a corresponding task log to the master control device; and
a third registering module, configured to do the following: if the return code matching the task information started and executed by the corresponding task subprocess does not exist, determine that the corresponding task subprocess has not fully executed the task information when the main process is restarted, the task processing device registers the task information in the memory and starts the corresponding task subprocess to re-execute the task information.

13. The apparatus according to claim 10, wherein the apparatus further comprises:
a generation module, configured to extract a path parameter from the task information and generate the task execution path according to the path parameter; and
a second storage module, configured to be used by the proxy process to store the task identifier to the target location according to the task execution path.

14. The apparatus according to claim 8, wherein the apparatus further comprises:
a monitoring module, configured to be used by the main process of the task processing device to monitor, according to the task identifier, whether the task information is started and executed, and monitor, according to the return code, whether the task information is fully executed.

15. A task processing system based on a distributed system, the system comprising:
a master control device, configured to store task information; and
a task processing device, communicating with the master control device and is configured to obtain, by a main process of the task processing device, the task information from the master control device by initiating a task request,
wherein the task information corresponding to the task request is stored in the master control device;
the task processing device is further configured to start, by the main process of the task processing device, a corresponding task subprocess, in the task processing device, by triggering a proxy process, in the task processing device, for executing the task information after the main process obtains the task information from the master control device; and
the task processing device is further configured to store task execution information to a target location through the proxy process, wherein the task execution information comprises one or more of the following pieces of information: a task identifier of the task information, process information of the task subprocess, log information, and a return code generated when the task subprocess executes the task information.

16. The method according to claim 1, wherein the process information corresponds to a process number of the task subprocess, and wherein each of the task subprocess stores respective process number to the task information.

17. The method according to claim 1, wherein the log information is generated by the task subprocess when executing the task information, and wherein the proxy process associated with the task subprocess, writes and reads the log information.

18. The method according to claim 1, wherein the task processing device is in a first network segment and the master control device is in a second network segment.

19. The method according to claim 18, wherein the first network segment and the second network segment are different network segments.

20. The method according to claim 1, wherein the main process and the task subprocess in the task processing device are isolated with the proxy process such that in an event the main process is stopped, the proxy process and the task subprocess remain unaffected.

* * * * *